May 10, 1966  F. S. MORGAN  3,250,543
METHOD AND APPARATUS FOR THERMO-ELECTRICALLY CONTROLLING
FLUID SUSPENSION UNITS EMPLOYED BETWEEN TWO RELATIVELY
MOVABLE MEMBERS SUBJECT TO VARYING LOADS
Filed April 13, 1962

INVENTOR
Frank S. Morgan

BY Wilkinson, Mawhinney & Thibault
ATTORNEYS

United States Patent Office 3,250,543
Patented May 10, 1966

3,250,543
METHOD AND APPARATUS FOR THERMO-ELECTRICALLY CONTROLLING FLUID SUSPENSION UNITS EMPLOYED BETWEEN TWO RELATIVELY MOVABLE MEMBERS SUBJECT TO VARYING LOADS
Frank Sayre Morgan, 1901 N. Hollister St., Arlington, Va.
Filed Apr. 13, 1962, Ser. No. 187,295
15 Claims. (Cl. 280—6)

The present invention relates to method and apparatus for thermo-electrically controlling fluid suspension units employed between two relatively movable members subject to varying loads, and has for an object to provide both a method and apparatus for varying the operation of a spring or the like, particularly a gaseous liquid cushion by thermal and other means.

Suspension or spring systems of various constructions are known which operate with air or gaseous liquids and in which variable loads can be accommodated by increasing or decreasing the amount of gas contained in the gas cushion.

In air suspension systems of the general type referred to above, there is a certain amount of leakage of the gas from the system when the vehicle stands idle for a prolonged period of time, due to the many lines and valve connections used in the system, allowing the chassis to settle downwardly relative to the running gear.

To prevent such settling, the air compressor that supplies the air under pressure to the reservoir is operated by a pressure responsive switch so that whenever the air pressure reservoir falls to a predetermined level, the compressor will operate to restore the pressure in the reservoir to its predetermined maximum level. The undue current loss resulting from this periodic operation of the compressor, however, after a period of time, runs down the battery. To avoid this, there are known control systems for deactivating the electrical circuit for the electric motor of the compressor after a certain number of operations of the compressor so that the battery of the vehicle will not become completely discharged.

An additional problem arising in the use of suspension control systems which increase or decrease the amount of air to accommodate varying loads is that condensation tends to build up in the system resulting in faulty operation of the valves through freezing of the accumulated moisture.

Systems are also known in which the pressure or volume of material is varied by means of a pressure operated switch which connects electrical heating elements to produce a temperature increase and automatic disconnection of said electrical heating elements to permit a temperature decrease by natural cooling of the system permitting the gas pressure to fall so far that the spring suspension becomes too soft and must be reheated again.

Other control means for such temperature varying spring systems are known which use a time-switch operated by a predetermined maximum deflection so that upon a spring depression beyond a certain amount, the time-switch is turned on for a definite time, that is, 10 to 60 seconds, to connect the heating element and thus heat the gas cushion to restore its volume under the applied load.

In known thermally varied volume or pressure suspension systems of the general type referred to above, there is a certain amount of overheating of the confined gaseous material due to the delay in heat transmission from the electrical heating element, through the heat exchange means used, to the cushion of gaseous material, resulting in the gas cushion continuing to receive heat after the pressure operated switch cuts off the heating current. Like a tea kettle that continues to boil after the electric heating element under it has been turned off. Overheating causes the pressure to exceed the correct predetermined pressure until the spring system cools off by natural heat transmission into the surrounding mechanism and ambient atmosphere. Furthermore, where the temperature of the ambient atmosphere exceeds the temperature necessary to maintain the gas cushion at the correct predetermined spring pressure, the gas cushion cannot cool down by normal cooling and remains at a temperature above the correct predetermined spring pressure producing a hard spring which holds the sprung chassis above the predetermined maximum level.

In the time-switch operated control means referred to above, there is no provision for turning off the heating current before the pre-set amount of time has elapsed, which permits of even more excessive overheating than the pressure operated switch described above.

Another object of this invention is to provide a thermo-electrically controlled sealed suspension unit with a height control responsive to the positioning of the piston of the suspension unit in the cylinder thereof, acting to vary the temperature of the confined gaseous material through selectively energizing the hot or cold slides of thermo-electric couplings, in reversible electric circuits, positioned to heat or cool the confined gas to maintain the piston in a predetermined relationship in the cylinder under varying load conditions carried by the vehicle.

A further object of this invention is to provide a thermo-electrically controlled sealed suspension unit in accordance with the foregoing objects wherein a control in the electrical circuits automatically determines the direction of flow of the electrical current through thermo-electric couplings, positioned with relation to one side of the thermal junction within the sealed gas cushion and with the other side insulated therefrom and outside the sealed gas cushion, so that upon causing the electrical current to flow in one direction through the thermal junction the side of the junction located within the sealed cushion is increased in temperature, and upon causing the current to flow in the reverse direction through the thermal junction the side of the junction located within the sealed gas cushion is decreased in temperature, said automatic control being actuated only upon prolonged displacement of the piston out of a normal predetermined at rest position.

A still further object of this invention is to provide a thermo-electrically controlled sealed suspension unit in accordance with the foregoing objects, wherein a damping device is provided to prevent normal rapid oscillating movements of the vehicle axle from effecting operation of the control so long as the piston movement is such that the average of the movements of the piston disposes the piston in a predetermined relationship between the sprung mass of the vehicle and the unsprung mass.

Another object of this invention is to provide a thermo-electrically controlled suspension unit in accordance with the foregoing objects wherein the supply of gaseous fluid remains constant after initial loading at low temperature and develops sufficient pressure at achieving a predetermined temperature to support the normal load at the predetermined height relationship to the unsprung mass without reliance upon the temperature control system.

A further object of the present invention is the provision of a process for gaseous suspension between sprung and unsprung frames of a vehicle and which includes a new use of a known thermocouple of electrically inducing bi-directional regulation of the temperature of a gaseous fluid in a sealed fluid cushion.

In accordance with the present invention the pressure or volume of gaseous liquid in a spring or like system is varied by means of temperature change brought about by a thermo-electric heating or cooling of the cushion of confined gaseous liquid. This positive heating or cooling is accomplished by the use of thermo-electric elements as part of an electrical circuit to generate heat or cold at the junction between different metals, when a current of one or the other direction is passed through the circuit.

In the present invention one or more couplings of thermoelectric elements are placed in a novel arrangement with relationship to the gas cushion so as to permit of electrically induced heating or cooling of the gaseous liquid confined within the expansible bellows spring to maintain a predetermined height and accommodate variable loads.

With the foregoing and other objects in view, the invention will be more fully described hereinafter, and will be more particularly pointed out in the claims appended hereto.

In the drawings, wherein like symbols refer to like or corresponding parts throughout the several views.

Figure 2:
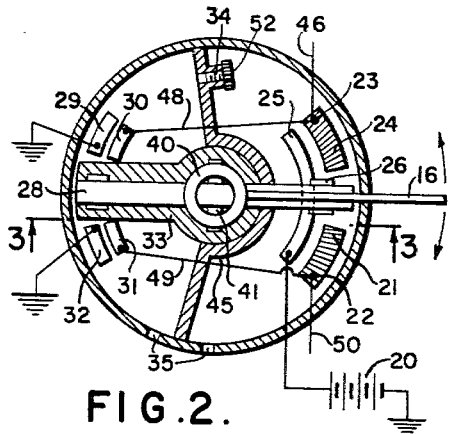
FIGURE 2 is a horizontal section through the height control regulator valve shown in FIGURE 1.
Figure 1:
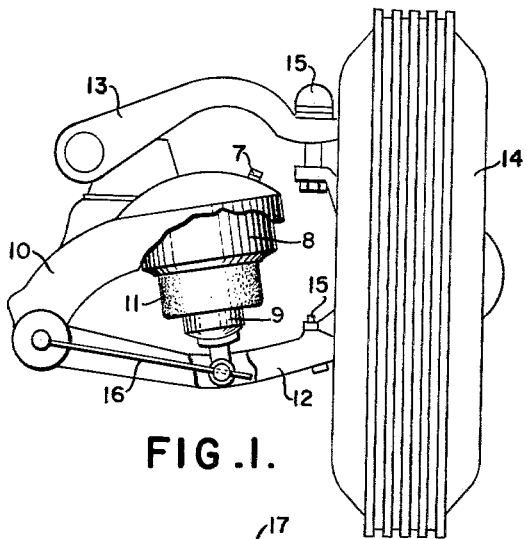
FIGURE 1 is a front elevational view of a portion of a front end suspension for a motor vehicle incorporating the thermo-electrically controlled suspension unit of this invention.
Figure 3:
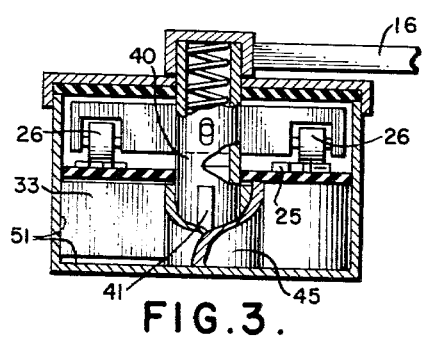
FIGURE 3 is a section of FIGURE 2 taken on lines 3—3 in FIGURE 2.

Referring to the drawings and more particularly to FIGURE 1 for the moment, a vehicle is shown having a chassis or frame 10 having a sprung mass supported by an extensible thermally reactive fluid spring assembly, which assembly comprises a cylinder 8, a piston 9 and a flexible diaphragm 11, carried between the vehicle frame 10 and a lower control arm 12; by way of example at the front end of a vehicle which includes the upper control arm 13, the control arms 12 and 13 supporting a wheel 14 through the ball joints 15.

Figure 4:
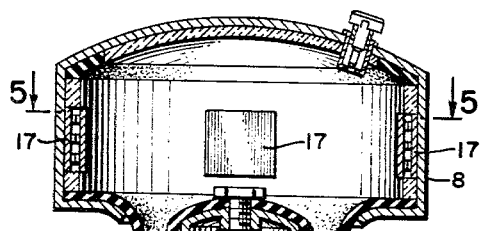
FIGURE 4 is a vertical sectional view of a suspension unit constructed in accordance with the present invention.

The fluid spring assembly shown in FIGURE 4 contains a gaseous thermally reactive fluid under pressure sufficient to support the sprung mass or chassis 10 upon the unsprung mass or wheel assembly. The fluid spring assembly is precharged with a gaseous liquid through an inlet valve 7, best seen in FIGURE 4, to establish a predetermined height relationship between the sprung mass 10 and the wheel assembly or unsprung mass.

Figure 5:
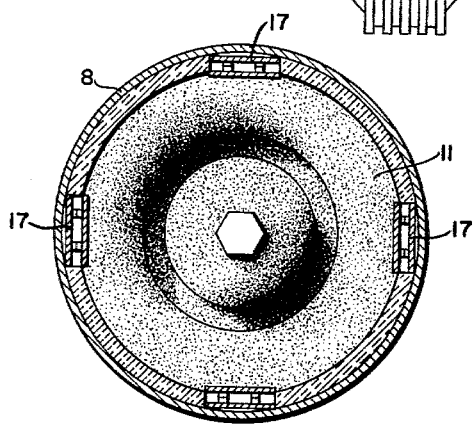
FIGURE 5 is a sectional view of the device of FIGURE 4 taken on the lines 5—5.
Figure 6:
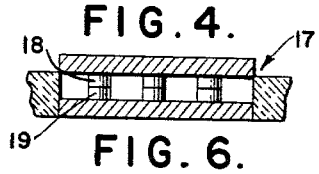
FIGURE 6 is a fragmentary cross-sectional view through a thermo-couple employed in FIGURE 5.

When the load on the sprung mass 10 increases the height relationship between the sprung mass 10 and the unsprung mass or wheel assembly is reduced. This change in height relationship causes the control actuating arm 16 to complete an electrical circuit between the electrical power source 20, through contact point 25, through contact roller 26 to the high resistance end of rheostat 24, thence through contact point 23 and line 46 to thermo-couples 17 (shown in FIGURES 4, 5 and 6) and return through line 50, and line 49 to contacts 31 and 32 to ground which completes the circuit.

The completion of this electrical circuit energizes thermocouple units 17 causing side 18 of the junction to increase in temperature and causing side 19 to decrease in temperature, thus heating the gaseous fluid within the fluid-tight chamber of cylinder 8 raising the temperature of the gaseous fluid causing it to expand. The increased pressure resulting therefrom balances the increased load on the sprung mass 10 and effect a height correction between the sprung mass 10 and the unsprung mass which returns the masses to their predetermined relative height relationship.

Similarly when the load decreases in the vehicle, the sprung mass 10 tends to rise relative to the unsprung mass or wheel assembly causing the control actuating arm 16 to complete an electrical circuit between the electrical power source 20, through contact point 25, through contact roller 26 to the high resistance end 21 of rheostat 22, through line 50 and thence through thermo-couple junctions formed between couples 18 which become hotter and 19 which become cooler and return through line 46 and line 48 to contacts 30 and 29 to ground, thus completing the circuit.

The completion of this circuit is in opposite direction to the circuit first described above and energizes thermo-couple unit 17 providing a decrease in temperature at the cold junction on side 18 of thermo-couple unit 17 and an increase at the hot junction side 19 of the thermo-couple unit 17, thus cooling the gaseous liquid within the cylinder 8 which lowers the temperature thereof causing it to contract. The decreased pressure resulting therefrom allowing the chassis to settle downwardly and reestablish the predetermined relative height relationship between the sprung and unsprung mass. The rheostats 21 and 24 permit increased flow of current as contact roller 26 nears contacts on rheostats 22 and 23, respectively.

The directional flow of electrical current through thermo-electric coupling 17 is regulated through control arm 16 which is constructed of resilient material to absorb the rapid oscillations of the wheel assembly without changing the position of the cross-over switch arm 28 unless there is a prolonged displacement of the piston 9 out of its normal predetermined "at rest" position. Prolonged displacement of piston 9 out of its predetermined "at rest" position causes control actuating arm 16 to effect a change of position in the cross-over switch arm 28 which is coaxially mounted in rotary damping piston 33 and is held in fixed axial relationship to rotary piston 33 by keys 41 which are an integral part of cylinder 40.

Cylinder 40 is in turn rotatably mounted in coaxial relationship with cylindrically-shaped housing 45 so as to permit movement of cross-over switch arm 28 only when there is sufficiently prolonged displacement of piston 9 out of its normal predetermined "at rest" position to effect a change of position in the rotary damping piston 33.

Rotary damping piston 33 is slidably mounted in a rotary sleeve chamber 51 with sufficiently close tolerance to permit piston movement only at the rate of flow at which air is permitted to enter or escape from rotary sleeve member 51 through air needle valve 34 and ports 35, respectively.

Thus the rotary damping piston 33 will not be moved appreciably by the rapid oscillating movements of the piston 9 which are transmitted through the resilient control arm 16, but will only be caused to be moved appreciably by prolonged displacement of the piston 9 out of its normal predetermined "at rest" position.

The damping rotary piston 33 can be easily adjusted to offer varying rates of flow of air through rotary sleeve chamber 51 and thus varying resistance to the movement of the damping piston 33 by adjustment of the air inlet needle valve 34 by turning the knurled adjustment screw head 52 clockwise to decrease the flow of air and counter-clockwise to increase the flow of air.

The fluid spring assembly shown in FIGURE 4 is precharged with a gaseous liquid through gaseous fluid pressure medium inlet valve 7 to establish a predetermined height relationship between the sprung mass 10 and the wheel assembly and unsprung mass. By way of example one of the thermally reactive gaseous fluids which may be employed in practicing this invention may be methyl chloride; other gases which are thermally reactive such as Freon, methylene bromide, may be employed. The flexible diaphragm 11 is bonded to the cylinder 8 to assure a fluid-tight relationship between the piston and cylinder whereby the gaseous fluid, once having been charged through the inlet connection 7, will be trapped within the air cushion assembly.

Figure 7:
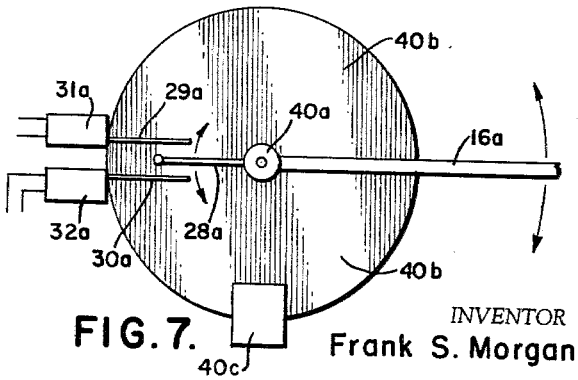
FIGURE 7 is a schematic view of a modified form of a height control regulator with damping means.

Seen in FIGURE 7 is a modified form of height sensing device which comprises a U-shaped permanent magnet 40c mounted independently of a non-magnetic flat circular disc 40b which is pivotally mounted in cooperation with resilient height control arm 16a and rigid switch arm 28a on mounting shaft 40a with the peripheral edge of disc 40b positioned equi-distant between the two prongs of U-shaped magnet 40c. Wands 29a and 30a operate micro-switches 21a and 32a which are each connected to an electrical power source and connected in series with all four thermocouples 17.

When the vehicle is operated over irregular terrain, the rapid oscillations of the lower control arm 12 relative to the sprung mass 10, resilient height control arm 16a is flexed upwardly rapidly but since this would cause disc 40b to rotate rapidly, relative to permanent magnet 40c, the flux control of the magnet 40c will prevent rotation of disc 40b to thereby maintain rigid wand 28a in the position shown. However, by reason of its resiliency and the manner in which it is positioned, the end of height control arm 16a which is connected to lower control arm 12 is flexed upwardly by the movement of the lower control arm without overcoming the holding action of the magnet and the associated non-magnetic disc means 40b.

As rebound movement occurs the flux control of the magnet 40c likewise prevents rotation of disc 40b to maintain rigid wand 28a in mid-position between switch wands 29a and 30a as shown.

Assume that with the vehicle stationary the vehicle loading is materially increased thereby causing the static pressure in the fluid spring to permit a slow downward deflection of the fluid spring cylinder 8 relative to the piston 9 and thereby lowering the mean static position of the sprung load. This relatively slow downward movement of cylinder 8 causing a relatively slow upward counter-clockwise movement of the entire height control arm 16a and disc 40b. The magnet 40c, in these circumstances, would not resist the resulting slow rotation of disc 40b in view of the very slow cutting of its lines of flux and thus permitting switch wand 28a to make contact with switch wand 30a which in turn trips micro-switch 32a completing a circuit between the power source and thermoelectric elements 17 so as to cause their inner surfaces to become hot thus increasing the temperature and pressure within the fluid spring until the increased height resulting therefrom severed the connection between wand 28a and switch wand 30a and turned off the current.

A corresponding decrease in vehicle load would cause a clockwise movement of disc 40b resulting in establishing a reverse electrical current from that which resulted from switch arm 28a contacting switch wand 30a and establishing an electrical circuit between the power source and the thermoelectric elements 17 which in turn would produce a cold surface on the inner face of thermoelectric elements 17 which would lower the temperature of the condensible gas in the spring chamber thereby lowering the pressure therein until the vehicle returned to its mean static height once more. At this point the electrical circuit is broken by switch wand 28a being returned to the median position shown in FIGURE 7.

The thermo-electric elements 17 illustrated herein and described hereinbefore may be of a known type, for example, the type described in United States Letters Patent 2,793,243, granted May 21, 1957, to N. E. Lindenblad. I do not restrict myself to this specific form of thermo-electric coupling but merely set forth the same as but one example of a commercially available form of thermo-electric element which may be employed in the combination of my invention. The use of the thermo-electric couple in a gaseous suspension system for bi-directionally controlling the temperature of the thermally reactive fluid employed in the cushion is one of the aspects of my invention.

Although I have disclosed herein the best forms of the invention known to me at this time, I reserve the right to all such modifications and changes as may come within the scope of the following claims.

What is claimed is:

1. For use with a casing of at least one chamber the volume of which may be varied in at least one direction in response to a changing physical load upon the casing,
    (a) said casing including a fluid-tight chamber and having a thermally reactive fluid therein for expanding and contracting the volume of said fluid-tight chamber,
    (b) a fluid thermal control unit comprising an assembly having a junction between at least two materials having dissimilar thermo-electric properties disposed in heat transfer relationship to thermally act upon the thermally reactive fluid of said fluid-tight chamber, and
    (c) means in electric circuit with said materials for automatically positively bi-directionally regulating the temperature of said thermally reactive fluid to expand and contract the volume of said fluid-tight chamber upon indication that the volume of the casing should be varied incident to changing loads upon said casing.

2. A self leveling device for use between the sprung and unsprung mass of a vehicle comprising
    (a) a fluid spring means having at least one fluid-tight chamber the opposed walls of which are movable relative to one another,
    (b) one of said walls being adapted to be connected to the sprung mass of the vehicle,
    (c) the other of said walls adapted to be connected to the unsprung mass of the vehicle,
    (d) a thermally reactive fluid in said chamber for expanding and contracting the volume of said chamber,
    (e) a thermal control unit having a junction between at least two materials having dissimilar thermo-electric properties positioned in said chamber and in electric circuit to heat and expand the fluid in said fluid-tight chamber when current is passed through said unit in one direction and to cool and contract the fluid in said fluid-tight chamber when current is passed in the reverse direction through said unit, and
    (f) automatic signal means between said sprung and unsprung mass connected to actuate said thermal unit to cause current to flow through the thermal unit to heat the fluid in said fluid-tight chamber causing the chamber to extend and increase the distance between the sprung and unsprung mass when a load is imposed on the vehicle frame and to cause current to flow through the thermal unit to cool the fluid in said chamber causing the chamber to contract and decrease the distance between the sprung and unsprung mass.

3. A device as claimed in claim 2 wherein
    (g) said fluid spring means is a cylinder and a piston wherein the relatively movable walls of the fluid-tight chamber are defined by the inner end wall of the cylinder and the head end of the piston.

4. A device as claimed in claim 2 wherein
    (g) the thermally reactive fluid is methyl chloride.

5. A device as claimed in claim 2 wherein
    (g) said thermal control unit is a thermo-couple of two metals having a junction between two elements having dissimilar thermo-electric properties.

6. A device as claimed in claim 2 wherein
    (g) said signal means is a split rheostat and pivotal contact arm for reversing current flow direction to said thermo-couple unit.

7. A device as claimed in claim 2 wherein (g) said signal means is a pair of micro switches in circuit with the thermo-couple unit, (h) the actuating wands of said micro switches having a pivotal contact arm the minor pivotal portions of which will contact and actuate one of said micro switches depending upon the position of the major portion of said arm with respect to the relative position of the sprung mass to the unsprung mass of the vehicle.

8. The process of resiliently supporting the sprung mass of a vehicle relative to the unsprung mass of the vehicle comprising (a) suspending the sprung mass from the unsprung mass by a fluid-tight cushion of a thermally reactive fluid, (b) electrically induced bi-directional temperature regulation of the thermally reactive fluid to expand and contract the fluid-tight cushion, and (c) automatically detecting load variations between the unsprung mass and sprung mass to activate and regulate the temperature of the thermally reactive fluid in accordance with the condition detected to regulate and restore a predetermined volume of the fluid-tight cushion.

9. A vehicle suspension system comprising (a) expansible fluid spring means resiliently supporting the sprung mass of a vehicle relative to the unsprung mass thereof, and (b) automatic control means in heat exchange relationship with the expansible fluid actuated by a change in relative height position between the sprung mass and the unsprung mass to electrically induce raising and lowering of the temperature of the expansible fluid in said spring means to effect height correction between the sprung mass and the unsprung mass and restore the masses to a predetermined relative height relation.

10. In a vehicle suspension system comprising (a) an expansible fluid spring means resiliently supporting the sprung mass of a vehicle relative to the unsprung mass thereof, (b) thermo-electric automatic control means in heat exchange relationship with the expansible fluid actuated by a change in relative height position between the sprung mass and the unsprung mass to electrically induce raising and lowering of the temperature of the expansible fluid in said spring means to effect height correction between the sprung mass and the unsprung mass and restore the masses to a predetermined relative height relation, and (c) damping means to prevent oscillating movements of the unsprung mass of the vehicle from affecting operation of the control so long as said movements are such that the average of the movements of the unsprung mass disposes the unsprung mass in a predetermined relationship to the sprung mass.

11. In a vehicle suspension system comprising (a) a sealed expansible fluid spring means containing a predetermined amount of expansible fluid resiliently supporting the sprung mass of the vehicle relative to the unsprung mass thereof, (b) automatic control means in heat exchange relationship with the expansible fluid actuated by a change in relative height position between the sprung mass and the unsprung mass to electrically induce raising and lowering of the temperature of the expansible fluid in said spring means to effect height correction between the sprung mass and the unsprung mass and restore the masses to a predetermined relative height relation.

12. In a vehicle suspension system comprising (a) a sealed expansible fluid spring means containing a predetermined amount of expansible fluid resiliently supporting the sprung mass of the vehicle relative to the unsprung mass thereof.

(b) control means in communication with the expansible fluid actuated by a change in relative height position between the sprung mass and the unsprung mass to electrically induce raising or lowering of the temperature of the expansible fluid in said spring means to effect height correction between the sprung mass and the unsprung mass and restore the masses to a predetermined mass and restore the masses to a predetermined relative height relation, and (c) height control means for said control means, damping means for said height control means to prevent oscillating movements of the unsprung mass of the vehicle from affecting operation of the control so long as said movements are such that the average of the movements of the unsprung mass disposes the unsprung mass in a predetermined relationship to the sprung mass.

13. In a vehicle suspension system comprising (a) a sealed expansible fluid spring means resiliently supporting the sprung mass of a vehicle relative to the unsprung mass thereof, (b) control means in communication with the expansible fluid comprised of an electrical circuit containing one or more thermo-electric elements comprising single or multiple junctions between different metals, said elements generating heat or cold at the junction when a current of one or the other direction is passed through the circuit, and positioned in heat-exchange relationship to said expansible fluid spring means, and (c) means for reversing the current in said circuit actuated by a change in relative height position between the sprung mass and the unsprung mass to positively raise or lower the temperature of the expansible fluid in said spring means to affect height correction between the sprung mass and the unsprung mass and restore the masses to a predetermined relative height relationship.

14. A vehicle suspension system as claimed in claim 13 wherein (d) damping means are provided to prevent oscillating movements of the unsprung mass of the vehicle from affecting operation of the control means for reversing the electrical circuit so long as said movements are such that the average of the movements of the unsprung mass disposes the unsprung mass in a predetermined relationship to the sprung mass.

15. A vehicle suspension system as claimed in claim 13 wherein (d) damping means are provided in the control means described therein consisting of a rotary piston mounted in fixed axial relationship to a cylinder through engagement of a key which is an integral part of the cylinder with a slot and slidably mounted in rotary sleeve chamber to permit free rotary movement therein.

References Cited by the Examiner

UNITED STATES PATENTS

| | | |
|---|---|---|
| 2,800,320 | 7/1957 | Jarret. |
| 2,805,854 | 9/1957 | Gaebler. |
| 2,921,160 | 1/1960 | Lautzenhiser. |
| 2,949,315 | 8/1960 | Taylor _____ 280—124 |
| 2,989,281 | 6/1961 | Fritts _____ 251—11 |
| 2,999,680 | 9/1961 | Eiseman _____ 267—65 X |
| 3,077,743 | 2/1963 | Castro _____ 180—1 X |
| 3,091,919 | 6/1963 | Coles _____ 60—23 |

FOREIGN PATENTS 1,057,830   5/1959   Germany.

BENJAMIN HERSH, *Primary Examiner.*

LEO FRIAGLIA, *Examiner.*

W. A. MARCONTELL, *Assistant Examiner.*